US011134535B2

(12) United States Patent
Fujishiro et al.

(10) Patent No.: US 11,134,535 B2
(45) Date of Patent: Sep. 28, 2021

(54) RADIO TERMINAL AND BASE STATION

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/396,807

(22) Filed: Apr. 29, 2019

(65) Prior Publication Data

US 2019/0261447 A1 Aug. 22, 2019

Related U.S. Application Data

(63) Continuation of application No. PCT/JP2017/039611, filed on Nov. 1, 2017.

(Continued)

(51) Int. Cl.
*H04W 76/27* (2018.01)
*H04W 68/00* (2009.01)
*H04W 76/11* (2018.01)
*H04W 76/30* (2018.01)
*H04W 76/20* (2018.01)
*H04W 8/02* (2009.01)

(52) U.S. Cl.
CPC ............. *H04W 76/27* (2018.02); *H04W 8/02* (2013.01); *H04W 68/00* (2013.01); *H04W 76/11* (2018.02); *H04W 76/20* (2018.02); *H04W 76/30* (2018.02)

(58) Field of Classification Search
CPC ..... H04W 76/27; H04W 76/20; H04W 76/30; H04W 76/11; H04W 8/02; H04W 68/00
See application file for complete search history.

(56) References Cited

U.S. PATENT DOCUMENTS

2004/0224689 A1\* 11/2004 Raghuram ............ H04W 48/16
455/435.3
2013/0288679 A1\* 10/2013 Yi ......................... H04W 48/08
455/435.1

(Continued)

OTHER PUBLICATIONS

Intel Corporation; "Email discussion report on [95#31] [LTE/Light connection] Progress FFS"; 3GPP TSG RAN WG2 Meeting #95bis; R2-166688; Oct. 10-14, 2016; total 14 pages; Kaohsiung, Taiwan.

(Continued)

*Primary Examiner* — Luat Phung
(74) *Attorney, Agent, or Firm* — Studebaker & Brackett PC

(57) ABSTRACT

A user equipment for a mobile communication system, includes: a receiver configured to receive a radio resource control (RRC) release message for transitioning the user equipment to a specific state, from a base station via a serving cell; and a controller configured to cause the user equipment to transition to the specific state in response to the reception of the RRC release message. The RRC release message includes: a radio access network (RAN) paging area identifier indicating a RAN paging area configured by the base station to the user equipment; and a public land mobile network (PLMN) identifier indicating a PLMN corresponding to the RAN paging area. The controller is configured to perform a process of transmitting a notification to a cell when the user equipment moves to the cell that does not belong to the RAN paging area after transitioning to the specific state.

4 Claims, 12 Drawing Sheets

Related U.S. Application Data

(60) Provisional application No. 62/417,532, filed on Nov. 4, 2016.

(56) References Cited

U.S. PATENT DOCUMENTS

| | | | | |
|---|---|---|---|---|
| 2015/0237536 | A1* | 8/2015 | Shu | H04W 36/0022 455/435.1 |
| 2019/0166553 | A1* | 5/2019 | Ryoo | H04W 76/27 |
| 2019/0174571 | A1* | 6/2019 | Deenoo | H04W 76/11 |
| 2019/0223151 | A1* | 7/2019 | Li | H04W 8/22 |
| 2019/0320412 | A1* | 10/2019 | Drevo | H04W 72/0406 |
| 2019/0342853 | A1* | 11/2019 | Li | H04W 68/02 |

OTHER PUBLICATIONS

Huawei; "Open issues in User Plane solution"; 3GPP TSG-RAN3 Meeting #91-bis; R3-160644; Apr. 11-15, 2016; total 4 pages; Bangalore, India.

Vodafone Airtouch; "Revised: Use of 'new' BA_RANGE for improved RPLMN selection"; TSG-RAN Working Group 2 (Radio layer 2 and Radio layer 3); TSGR2#17(00)2479; Nov. 13-17, 2000; total 5 pages; Sophia Antipolis, France.

LG Electronics Inc., Considerations of paging area configuration on the LTE lightweight connection, 3GPP TSG-RAN WG2, Meeting #95bis, R2-167120, Oct. 10-14, 2016, pp. 1-3, Kaohsiung, Taiwan.

Nokia, Alcatel-Lucent Shanghai Bell, Configuration and light connection area handling, 3GPP TSG-RAN WG2, Meeting #95bis, R2-164866, Aug. 22-26, 2016, pp. 1-3, Gothenburg, Sweden.

Kyocera, UE behaviour and signalling for Light Connection, 3GPP TSG-RAN WG2, Meeting #95bis, R2-166858, Oct. 10-14, 2016, pp. 1-8, Kaohsiung, Taiwan.

\* cited by examiner

RADIO TERMINAL AND BASE STATION

RELATED APPLICATION

This application is a continuation application of international application PCT/JP2017/039611, filed Nov. 1, 2017, which claims the benefit of U.S. Provisional Application No. 62/417,532 filed Nov. 4, 2016, the entire contents of which are incorporated herein by reference.

TECHNICAL FIELD

The present disclosure relates to a radio terminal and a base station that are used in a mobile communication system.

BACKGROUND ART

In recent years, with the spread of radio terminals such as smartphones capable of executing a lot of applications, the frequency at which a radio terminal connects to a network and the frequency at which a network performs paging of a radio terminal are increasing.

Therefore, in a mobile communication system, network load accompanying signaling is increasing. In view of such a situation, techniques for reducing signaling are being studied in the 3rd Generation Partnership Project (3GPP), which is the standardization project for mobile communication systems.

SUMMARY

A user equipment according to an embodiment is a radio terminal of a mobile communication system. The user equipment includes: a receiver configured to receive a radio resource control (RRC) release message for transitioning the user equipment to a specific state, from a base station via a serving cell; and a controller configured to cause the user equipment to transition to the specific state in response to the reception of the RRC release message. The RRC release message includes: a radio access network (RAN) paging area identifier indicating a RAN paging area configured by the base station to the user equipment; and a public land mobile network (PLMN) identifier indicating a PLMN corresponding to the RAN paging area. The controller is configured to perform a process of transmitting a notification to a cell when the user equipment moves to the cell that does not belong to the RAN paging area after transitioning to the specific state.

A base station according to an embodiment is a base station for managing a cell. The base station includes: a transmitter configured to transmit a list including a plurality of RAN paging area identifiers to a radio terminal via the cell if a plurality of RAN paging areas are allocated to the cell or the base station. Each of the plurality of RAN paging areas is an area in which paging is managed by a RAN including the base station.

A radio terminal according to an embodiment is a radio terminal of a mobile communication system. The radio terminal includes: a controller configured to determine whether a serving cell supports a function of handling a specific state in the specific state in which a RAN paging area is configured to the radio terminal. Even if the controller determines that the serving cell does not support the function, the controller is configured to maintain the specific state in the serving cell.

BRIEF DESCRIPTION OF DRAWINGS

DESCRIPTION OF EMBODIMENTS (Architecture of Mobile Communication System) Hereinafter, an architecture of a mobile communication system according to an embodiment will be described. FIG. 1 is a diagram illustrating an architecture of a Long Term Evolution (LTE) system that is the mobile communication system according to an embodiment. The LTE system is a mobile communication system based on the 3GPP standard.

As illustrated in FIG. 1, the LTE system includes a radio terminal (user equipment (UE)) 100, a radio access network (evolved-UMTS terrestrial radio access network (E-UTRAN)) 10, and a core network (evolved packet core (EPC)) 20.

The UE 100 is a mobile communication apparatus and performs radio communication with an eNB 200 that manages a cell (serving cell) in which the UE 100 exists.

The E-UTRAN 10 includes a base station (evolved Node-B (eNB)) 200. The eNBs 200 are connected to each other via an X2 interface. The eNB 200 manages one or more cells and performs radio communication with the UE 100 that has established connection to the cell. The eNB 200 has a radio resource management (RRM) function, a user data (hereinafter, simply referred to as "data") routing function, a measurement control function for mobility control and scheduling, and the like. The "cell" is used as the term indicating a minimum unit of radio communication area. The cell is used as the term indicating a function or resource of performing radio communication with the UE 100.

The EPC 20 includes a mobility management entity (MME) and a serving gateway (S-GW) 300. The MME performs various types of mobility control or the like on the UE 100. The MME communicates with the UE 100 by using non-access stratum (NAS) signaling to manage information of a tracking area (TA) in which the UE 100 exists. The tracking area is an area provided with a plurality of cells. The S-GW performs data transfer control. The MME and the S-GW are connected to the eNB 200 via an S1 interface.

Figure 1:
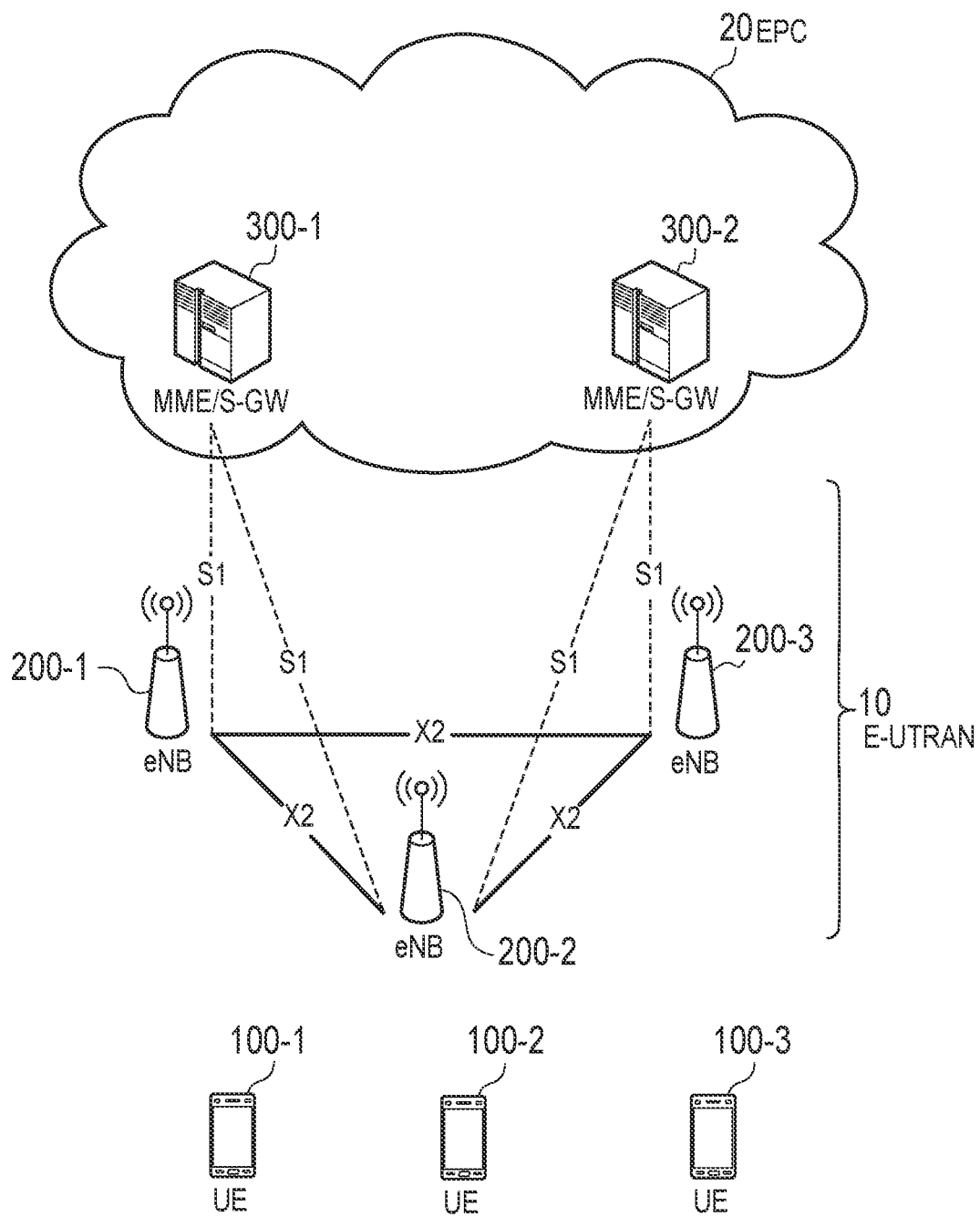
FIG. 1 is a diagram illustrating an architecture of an LTE system according to an embodiment.
Figure 2:
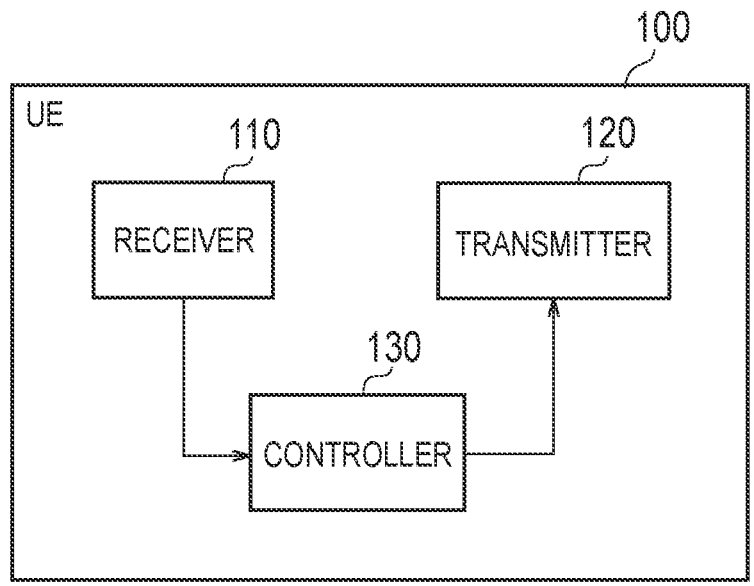
FIG. 2 is a diagram illustrating an architecture of a UE (radio terminal) according to an embodiment.

FIG. 2 is a diagram illustrating the architecture of the UE 100 (radio terminal). As illustrated in FIG. 2, the UE 100 includes a receiver 110, a transmitter 120, and a controller 130.

The receiver 110 performs a variety of reception under the control of the controller 130. The receiver 110 includes an antenna and a receiver. The receiver converts a radio signal received by the antenna into a baseband signal (reception signal) and outputs the baseband signal to the controller 130.

The transmitter 120 performs a variety of transmission under the control of the controller 130. The transmitter 120 includes an antenna and a transmitter. The transmitter converts a baseband signal (transmission signal) output by the controller 130 into a radio signal and transmits the radio signal from the antenna.

The controller 130 performs a variety of control on the UE 100. The controller 130 includes at least one processor and a memory. The memory stores a program executed by the processor and information used for processing by the processor. The processor may include a baseband processor that performs modulation and demodulation, coding and decoding, and the like of the baseband signal, and a central processing unit (CPU) that performs a variety of processes by executing a program stored in the memory. The processor performs a process to be described later.

Figure 3:
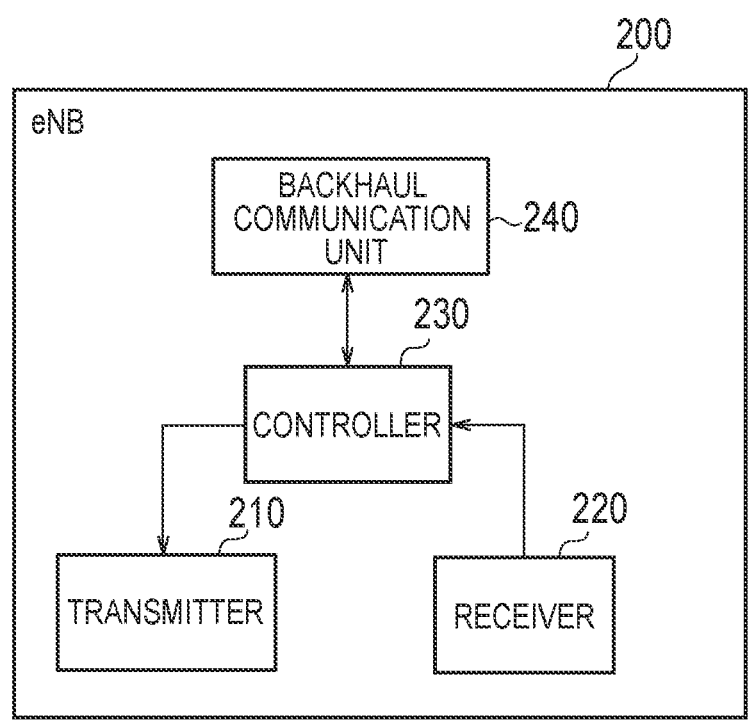
FIG. 3 is a diagram illustrating an architecture of an eNB (base station) according to an embodiment.

FIG. 3 is a diagram illustrating the architecture of the eNB 200 (base station). As illustrated in FIG. 3, the eNB 200 includes a transmitter 210, a receiver 220, a controller 230, and a backhaul communication unit 240.

The transmitter 210 performs a variety of transmission under the control of the controller 230. The transmitter 210 includes an antenna and a transmitter. The transmitter converts a baseband signal (transmission signal) output by the controller 230 into a radio signal and transmits the radio signal from the antenna.

The receiver 220 performs a variety of reception under the control of the controller 230. The receiver 220 includes an antenna and a receiver. The receiver converts a radio signal received by the antenna into a baseband signal (reception signal) and outputs the baseband signal to the controller 230.

The controller 230 performs a variety of control on the eNB 200. The controller 230 includes at least one processor and a memory. The memory stores a program executed by the processor and information used for processing by the processor. The processor may include a baseband processor that performs modulation and demodulation, coding and decoding, and the like of the baseband signal, and a CPU that performs a variety of processes by executing a program stored in the memory. The processor performs a process to be described later.

The backhaul communication unit 240 is connected to the neighbor eNB via an X2 interface and connected to the MME/S-GW 300 via an S1 interface. The backhaul communication unit 240 is used for communication performed on the X2 interface, communication performed on the S1 interface, and the like.

It should be noted that the MME includes a controller and a network communication unit. The controller performs a variety of control on the MME. The controller includes at least one processor and a memory. The memory stores a program executed by the processor and information used for processing by the processor. The processor may include a baseband processor that performs modulation and demodulation, coding and decoding, and the like of the baseband signal, and a CPU that performs a variety of processes by executing a program stored in the memory. The processor performs a process to be described later. The network communication unit is connected to the eNB 200 via an S1 interface. The network communication unit is used for communication or the like performed on the S1 interface.

Figure 4:
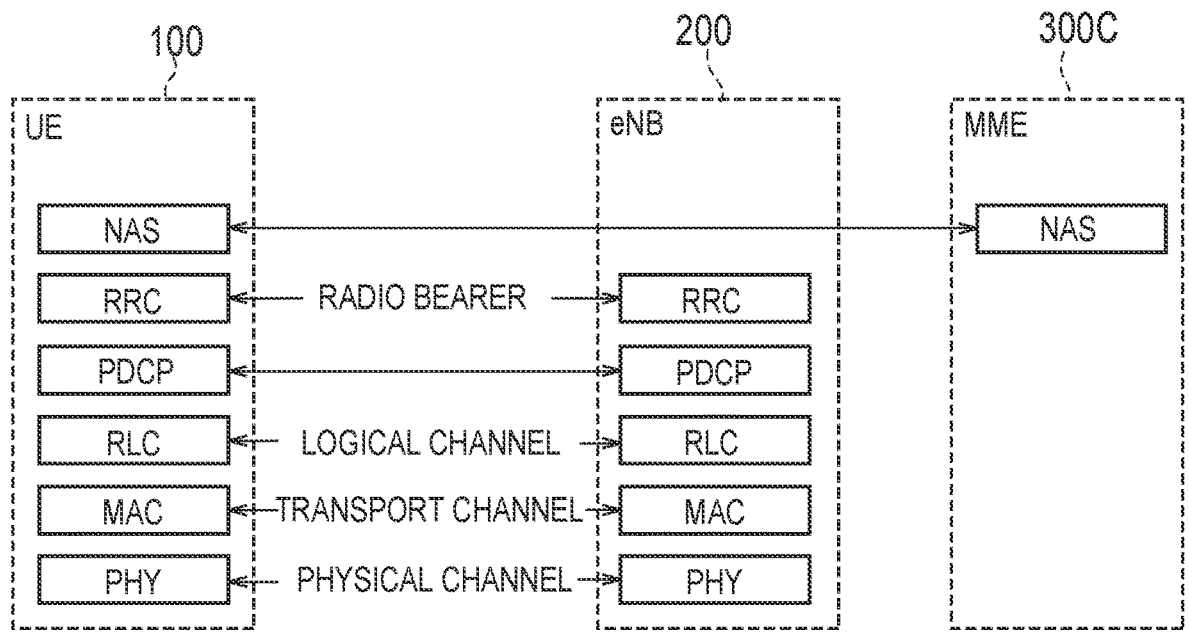
FIG. 4 is a diagram illustrating an architecture of a protocol stack of a radio interface in an LTE system according to an embodiment.

FIG. 4 is a diagram illustrating the architecture of the protocol stack of the radio interface in the LTE system. As illustrated in FIG. 4, a radio interface protocol is divided into a first layer to a third layer of an OSI reference model, and the first layer is a physical (PHY) layer. The second layer includes a medium access control (MAC) layer, a radio link control (RLC) layer, and a packet data convergence protocol (PDCP) layer. The third layer includes a radio resource control (RRC) layer. The PHY layer, the MAC layer, the RLC layer, the PDCP layer, and the RRC layer constitute an access stratum (AS) layer.

The PHY layer performs coding and decoding, modulation and demodulation, antenna mapping and demapping, and resource mapping and demapping. Data and control information are transmitted between the PHY layer of the UE 100 and the PHY layer of the eNB 200 via a physical channel.

The MAC layer performs priority control of data, a retransmission process by hybrid ARQ (HARQ), a random access procedure, and the like. Data and control information are transmitted between the MAC layer of the UE 100 and the MAC layer of the eNB 200 via a transport channel. The MAC layer of the eNB 200 includes a scheduler. The scheduler determines uplink and downlink transport formats (transport block size, modulation and coding scheme (MCS)) and resource blocks allocated to the UE 100.

The RLC layer transmits data to the RLC layer on the receiving side by using the functions of the MAC layer and the PHY layer. Data and control information are transmitted between the RLC layer of the UE 100 and the RLC layer of the eNB 200 via a logical channel.

The PDCP layer performs header compression and decompression, and encryption and decryption.

The RRC layer is defined only in a control plane that handles the control information. RRC signaling for various configurations is transmitted between the RRC layer of the UE 100 and the RRC layer of the eNB 200. The RRC layer controls logical channels, transport channels, and physical channels in response to establishment, reestablishment, and release of radio bearers. If there is a connection (RRC connection) between the RRC of the UE 100 and the RRC of the eNB 200, the UE 100 is in an RRC connected mode; otherwise, the UE 100 is in an RRC idle mode.

A NAS layer, which is located above the RRC layer, performs session management, mobility management, and the like. NAS signaling is transmitted between the NAS layer of the UE 100 and the NAS layer of the MME. It should be noted that the UE 100 has a function such as an application layer in addition to the protocol of the radio interface.

Figure 5:
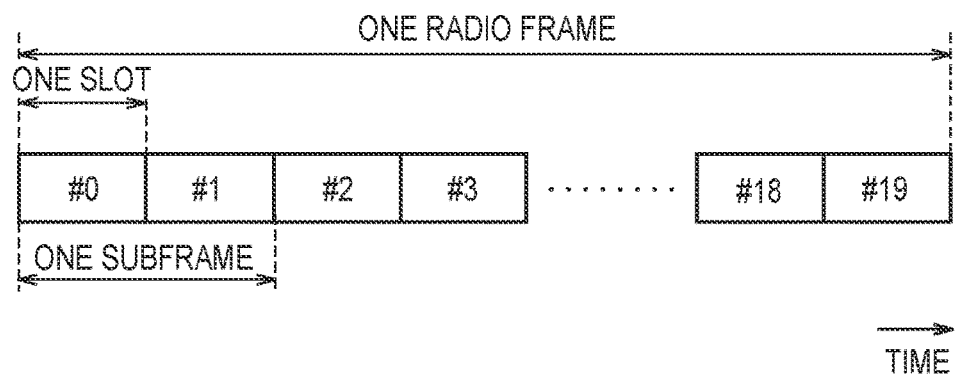
FIG. 5 is a diagram illustrating an architecture of a radio frame used in an LTE system according to an embodiment.

FIG. 5 is a diagram illustrating the architecture of the radio frame used in the LTE system. As illustrated in FIG. 5, the radio frame includes ten subframes on a time axis. Each subframe includes two slots on the time axis. A length of each subframe is 1 ms, and a length of each slot is 0.5 ms. Each subframe includes a plurality of resource blocks (RB) on a frequency axis and includes a plurality of symbols on a time axis. Each resource block includes a plurality of subcarriers on the frequency axis. Specifically, one RB is constituted by twelve subcarriers and one slot. One symbol and one subcarrier constitute one resource element (RE). In addition, among the radio resources (time and frequency resources) allocated to the UE 100, the frequency resource can be specified by the resource block and the time resource can be specified by the subframe (or slot).

In the downlink, a section of several symbols in the head of each subframe is a region that is mainly used as a physical downlink control channel (PDCCH) for transmitting downlink control information. In addition, the remaining portion of each subframe is a region that is mainly used as a physical downlink shared channel (PDSCH) for transmitting downlink data.

In the uplink, both end portions in the frequency direction in each subframe is a region that is mainly used as a physical uplink control channel (PUCCH) for transmitting uplink control information. The remaining portion of each subframe is a region that is mainly used as a physical uplink shared channel (PUSCH) for transmitting uplink data.

(Specific State)

A specific state according to an embodiment will be described. The specific state is a state in which the signaling for the UE 100 is suppressed while the S1 connection for the UE 100 is maintained. The S1 connection may be referred to as an S1 bearer. The S1 connection is a connection established between the eNB 200 and the EPC 20 on the S1 interface. The S1 interface includes an S1-U interface for a user plane and an S1-MME interface for a control plane. The S1 connection includes an S1-U connection established between the eNB 200 and the S-GW on the S1-U interface, an S1-MME connection established between the eNB 200 and the MME on the S1-C interface.

The specific state may be one state of an RRC connected mode or one state of an RRC idle mode. According to the specific state, signaling is reduced as compared with a general RRC connected mode. In addition, according to the specific state, the UE 100 can start data communication quickly, as compared with a general RRC idle mode. Hereinafter, the specific state is referred to as "light connection state (light connection substate)". In addition, a case in which the specific state is one state of the RRC connected mode is referred to as "modeling A". A case in which the specific state is one state of the RRC idle mode is referred to as "modeling B".

RAN paging is applied to the UE 100 in the light connection state. RAN paging performs paging in units of RAN paging areas in which paging is controlled by the E-UTRAN 10 (eNB 200). The RAN paging area is an area narrower than the tracking area. By introducing the RAN paging area, it is possible to reduce the number of cells that perform paging on one UE 100, thereby reducing signaling. As an example, the RAN paging area is constituted by the cell of the anchor eNB maintaining the S1 connection of the UE 100 in the light connection state and the cell of the neighbor eNB 200 of the anchor eNB. The neighbor eNB 200 may be an eNB 200 having an X2 interface with the anchor eNB. If the NAS signaling or data addressed to the UE 100 in the light connection state is received from the MME/S-GW 300, the anchor eNB determines that RAN paging is to be performed, and performs paging on the UE 100 together with the neighbor eNB 200. The paging may be performed by transmitting an RRC paging message.

Basic operations related to the light connection state are listed below.

The UE 100 that supports the light connection state (light connection operation) notifies the fact in UE capability information (UE-EUTRA-Capability).

The UE 100 transitions to the light connection state by RRC signaling. Specifically, the UE 100 is configured to the light connection state by unicast RRC signaling (RRC reconfiguration message or RRC release message).

The S1 connection of the UE 100 in the light connection state is maintained at "anchor eNB" and is active. The anchor eNB may be the eNB 200 that has transitioned the UE 100 to the light connection state. If the UE 100 moves to another RAN paging area, the anchor eNB may be switched.

From the viewpoint of the network, the light connection state is an EPS connection management (ECM) connected state. The ECM indicates a connection state between the UE 100 and the core network (MME).

Paging (RAN paging) can be performed with the RAN (E-UTRAN 10) startup with respect to the UE 100 in the light connection state. The RAN paging may be started by the anchor eNB. The RAN paging area is constituted by one or more cells. The plurality of cells may be managed by different eNBs. The paging message is defined by reusing a general RRC paging message.

Paging process (RAN paging) is controlled by the anchor eNB.

The RAN paging area can be configured to be UE-specific. The UE-specific RAN paging area is configured from the eNB 200 to the UE 100 by unicast signaling or broadcast signaling. The RAN paging area is designated by a cell list or a paging area ID.

The UE 100 in the light connection state performs a cell reselection mechanism similar to the RRC idle mode.

The context information (UE AS context) of the UE 100 in the light connection state is held in both the UE and the anchor eNB.

If the UE 100 in the light connection state detects paging or starts data transmission, the UE 100 resumes the connection with the eNB 200. Alternatively, the UE 100 may transition to the RRC connected mode.

If the UE 100 moves outside the configured RAN paging area, the UE 100 in the light connection state notifies the network of the fact.

The UE 100 in the light connection state performs the DRX operation by using the same parameters as the DRX operation in the RRC idle mode. The parameters for determining the paging opportunity may include the ID of the UE (for example, IMSI, S-TMSI, resume ID, and the like).

The UE 100 in the light connection state shifts to the operation of the general RRC connected mode by the RRC procedure. In the modeling A, the procedure is an RRC resume procedure or an RRC reestablishment procedure. In the modeling B, the procedure is an RRC resume procedure.

First Embodiment

The first embodiment will be described on the assumption of the mobile communication system as described above.

In the first embodiment, a scenario in which each eNB 200 (or each cell) transmits an identifier of an RAN paging area to which each eNB 200 belongs by broadcast signaling is assumed. In such a scenario, a method by which the eNB 200 transmits a RAN paging area identifier configured to the UE 100 by unicast signaling is considered.

However, such a method may increase the processing load for managing the RAN paging area identifier by explicitly configuring the RAN paging area identifier to the UE 100 by the eNB 200. In addition, the eNB 200 may configure, to the UE 100, the identifier of the RAN paging area that does not include the cell in which the UE 100 exists. In this case, when the UE 100 enters the light connection state, the UE 100 is located outside the configured RAN paging area. Thus, the UE 100 needs to immediately notify the network. The first embodiment is an embodiment that can solve such a problem.

The UE 100 (receiver 110) according to the first embodiment receives unicast signaling for transitioning the UE 100 to the light connection state from the eNB 200 via the serving cell. The UE 100 (controller 130) transitions to the light connection state in response to reception of the unicast signaling. The light connection state is a state in which the RAN paging area identifier indicating the RAN paging area where paging is managed by the RAN including the eNB 200 is configured to the UE 100. Even if the RAN paging area identifier is not included in the unicast signaling, the UE 100 (controller 130) holds an identifier of a predetermined area as the RAN paging area identifier configured to the UE 100 in the light connection state. The predetermined area is the serving cell or the RAN paging area to which the serving cell belongs.

As described above, according to the first embodiment, even if the eNB 200 does not explicitly configure the RAN paging area identifier to the UE 100, the UE 100 recognizes the serving cell at the time of transitioning to the light connection state or the RAN paging area to which the serving cell belongs as the RAN paging area configured to the UE 100. That is, as the RAN paging area applied to the UE 100, the serving cell when the UE 100 transitions to the light connection state or the RAN paging area to which the serving cell belongs is implicitly configured. Therefore, it is possible to solve the problem when the eNB 200 explicitly configures the RAN paging area identifier to the UE 100.

In the operation pattern 1 of the first embodiment, the UE 100 (receiver 110) receives, from the eNB 200, broadcast signaling including the identifier of the RAN paging area to which the serving cell belongs. In the light connection state, the UE 100 (controller 130) holds the identifier in the broadcast signaling as the RAN paging area identifier configured to the UE 100.

In the operation pattern 2 of the first embodiment, the unicast signaling instructing the transition to the light connection state includes information indicating that the RAN paging area configured to the UE 100 includes only the current serving cell. In the light connection state, the UE 100 (controller 130) holds the identifier of the serving cell as the RAN paging area identifier configured to the UE 100. According to the operation pattern 2, if the RAN paging area includes only one cell, it is not necessary to explicitly configure the RAN paging area to the UE 100. In addition, it is possible to prevent the RAN paging area identifier from being exhausted by diverting the cell identifier as the RAN paging area identifier. It should be noted that the cell identifier is, for example, physical cell ID (PCI) or E-UTRAN cell global ID (ECGI). The PCI is specified based on the synchronization signal transmitted by the eNB 200. The ECGI is included in the SIB transmitted by the eNB 200.

In the first embodiment, the UE 100 (controller 130) determines whether the UE 100 has moved to another cell not belonging to the RAN paging area (predetermined area) configured to the UE 100 in the light connection state. The UE 100 (controller 130) transmits a notification to the another cell in response to determining that the UE 100 has moved to the another cell.

Operation Pattern 1

Figure 6:
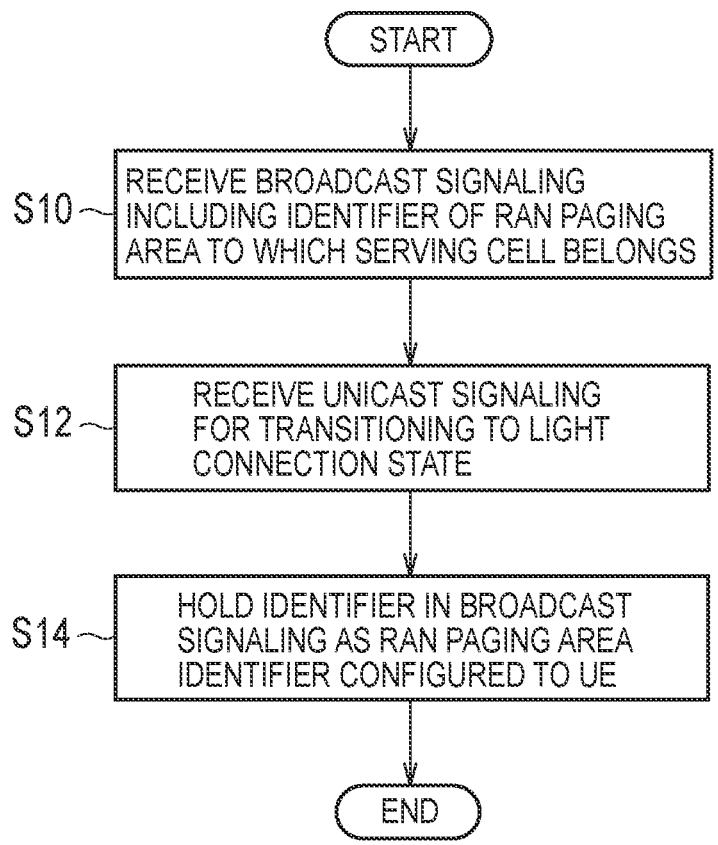
FIG. 6 is a diagram illustrating an operation flow of a UE according to an operation pattern 1 of a first embodiment.

FIG. 6 is a diagram illustrating the operation flow of the UE 100 according to the operation pattern 1 of the first embodiment.

As illustrated in FIG. 6, in step S10, the UE 100 (receiver 110) receives, from the serving cell, broadcast signaling including the identifier of the RAN paging area to which the serving cell belongs. The broadcast signaling may be broadcast RRC signaling (SIB: system information block). The UE 100 (controller 130) stores the identifier of the RAN paging area to which the serving cell belongs.

In step S12, the UE 100 (receiver 110) receives, from the serving cell, unicast signaling for transitioning the UE 100 to the light connection state. The unicast signaling may be unicast RRC signaling (RRC reconfiguration message or RRC release message).

In step S14, the UE 100 (controller 130) transitions to the light connection state and holds the identifier in the broadcast signaling (that is, the RAN paging area identifier received in step S10) as the RAN paging area identifier configured to the UE 100.

As described above, if the instruction to transition to the light connection state (RRC connection reconfiguration or release message) is received, the UE 100 reads and holds the identifier as the RAN paging area identifier allocated to the UE 100 when the RAN paging area identifier being currently broadcast is acquired or the already held RAN paging area identifier is valid. The RAN paging area identifier may be stored in a variable held by the UE 100.

Figure 7:
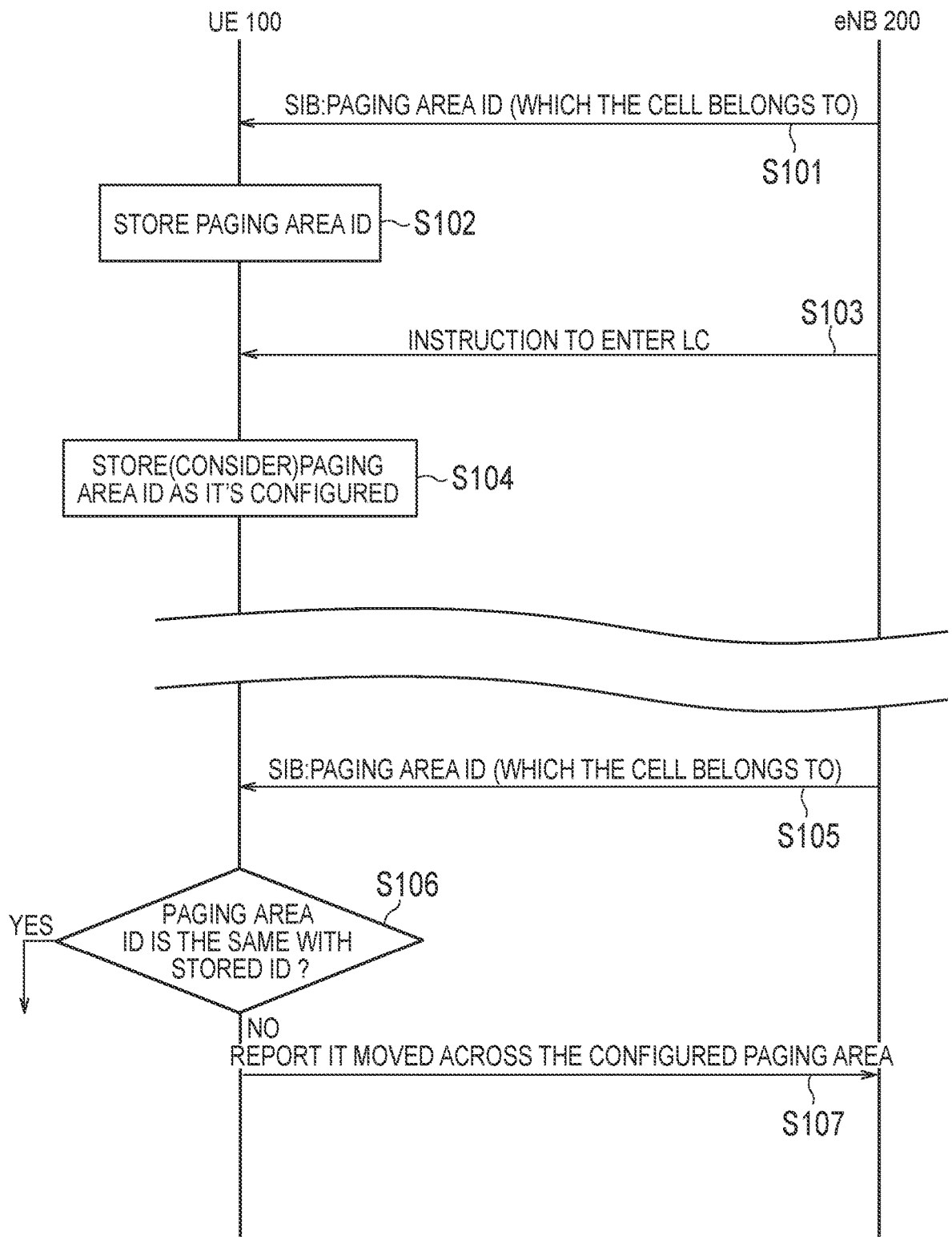
FIG. 7 is a diagram illustrating an operation sequence according to the operation pattern 1 of the first embodiment.

FIG. 7 is a diagram illustrating an operation sequence according to the operation pattern 1 of the first embodiment.

As illustrated in FIG. 7, in step S101, the eNB 200 transmits the SIB including the RAN paging area identifier (paging area ID) to which the cell (or the eNB) belongs. The UE 100 receives the SIB.

In step S102, the UE 100 stores the RAN paging area identifier (paging area ID) in the SIB.

In step S103, the eNB 200 transmits, to the UE 100, unicast signaling (Instruction to enter LC) for transitioning the UE 100 to the light connection state. It should be noted that the UE 100 is in the RRC connected mode when receiving the unicast signaling.

In step S104, the UE 100 transitions to the light connection state and holds the identifier in the SIB (that is, the RAN paging area identifier stored in step S102) as the RAN paging area identifier configured to the UE 100. In other words, the UE 100 regards the RAN paging area identifier in the SIB as the RAN paging area identifier configured to the UE 100.

After that, the UE 100 continues to stay in the cell when transitioning to the light connection state, or moves from the cell at the time of transitioning to the light connection state to another cell. Here, a case in which the UE 100 moves from the cell at the time of transitioning to the light connection state to another cell is mainly assumed. The UE 100 reselects the another cell by using the cell reselection mechanism similar to the RRC idle mode.

In step S105, the eNB 200 transmits the SIB including the RAN paging area identifier (paging area ID) to which the cell (or the eNB) belongs. The UE 100 receives the SIB.

In step S106, the UE 100 reads the held RAN paging area identifier and compares the read RAN paging area identifier with the RAN paging area identifier (that is, the RAN paging area identifier received in step S105) broadcasted by the current (new) cell.

If these are different (step S106: No), in step S107, the UE 100 transmits, to the current (new) cell, a notification indicating that it has left the RAN paging area configured to the UE 100 (report it moved across the configured paging area). On the other hand, in the case of "Yes" in step S106, the UE 100 does not perform the notification.

Operation Pattern 2

Figure 8:
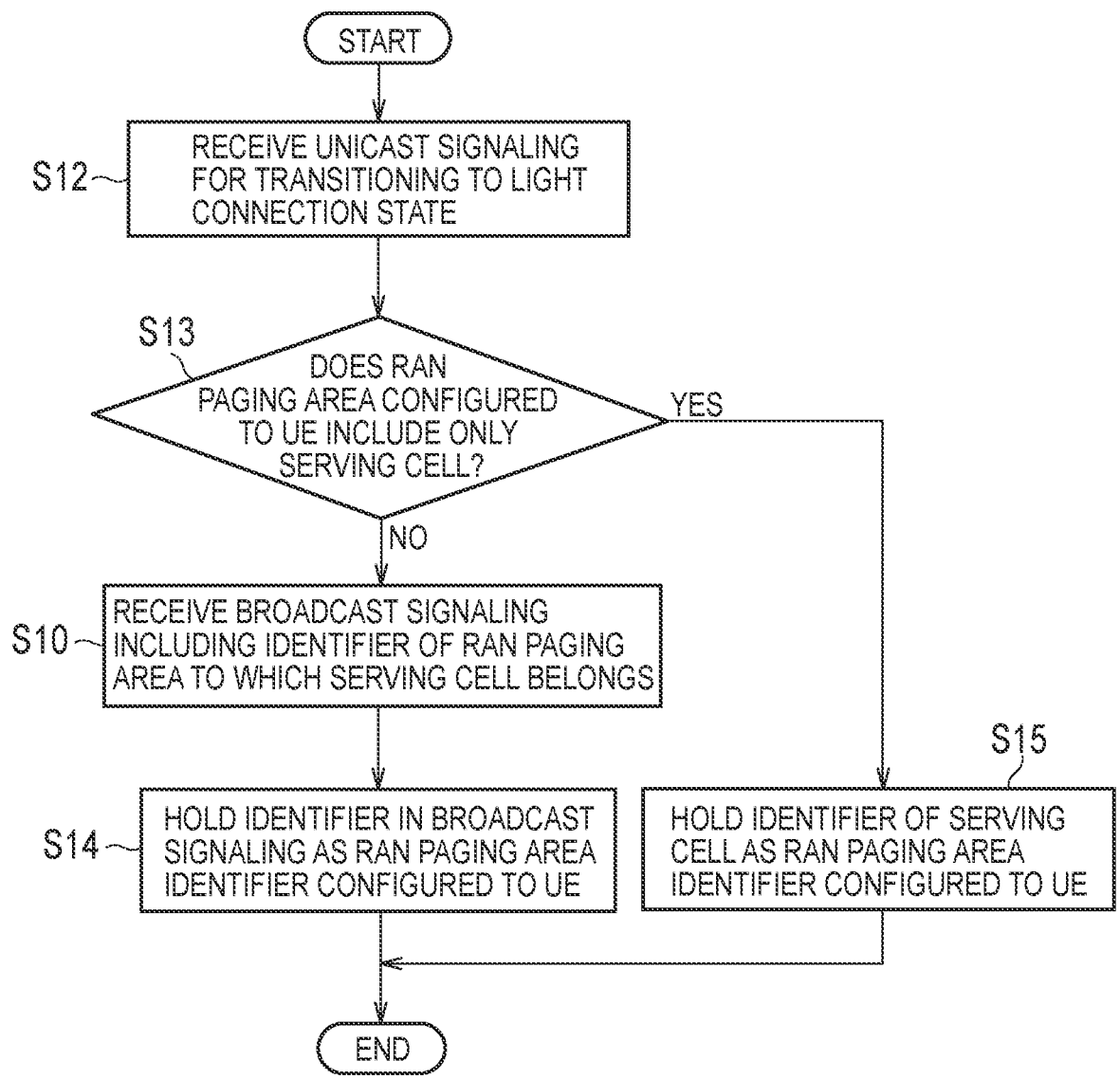
FIG. 8 is a diagram illustrating operations of a UE according to an operation pattern 2 of the first embodiment.

FIG. 8 is a diagram illustrating the operation of the UE 100 according to the operation pattern 2 of the first embodiment. In FIG. 8, the same step numbers as those in FIG. 6 are assigned to the same processing as the operation pattern 1 illustrated in FIG. 6.

As illustrated in FIG. 8, in step S12, the UE 100 (receiver 110) receives, from the serving cell, unicast signaling for transitioning to the light connection state. The unicast signaling may be unicast RRC signaling (RRC reconfiguration message or RRC release message). In the operation pattern 2, the unicast signaling includes information indicating whether the RAN paging area configured to the UE 100 includes only the current serving cell.

In step S13, the UE 100 (controller 130) determines whether the RAN paging area configured to the UE 100 includes only the current serving cell, based on the information included in the unicast signaling.

In the case of "NO" in step S13, in step S10, the UE 100 (receiver 110) receives, from the serving cell, broadcast signaling including the identifier of the RAN paging area to which the serving cell belongs. The broadcast signaling may be broadcast RRC signaling (SIB: system information block). The UE 100 (controller 130) stores the received RAN paging area identifier. In step S14, the UE 100 (controller 130) transitions to the light connection state and holds the identifier in the broadcast signaling (that is, the RAN paging area identifier received in step S10) as the RAN paging area identifier configured to the UE 100.

On the other hand, in the case of "YES" in step S13, in step S15, the UE 100 (controller 130) transitions to the light connection state and holds the identifier (cell identifier) of the current serving cell as the RAN paging area identifier configured to the UE 100. Alternatively, the UE 100 may hold information indicating that the RAN paging area configured to the UE 100 includes only the current serving cell.

Second Embodiment

In the second embodiment, a difference from the first embodiment will be described below.

Figure 9:
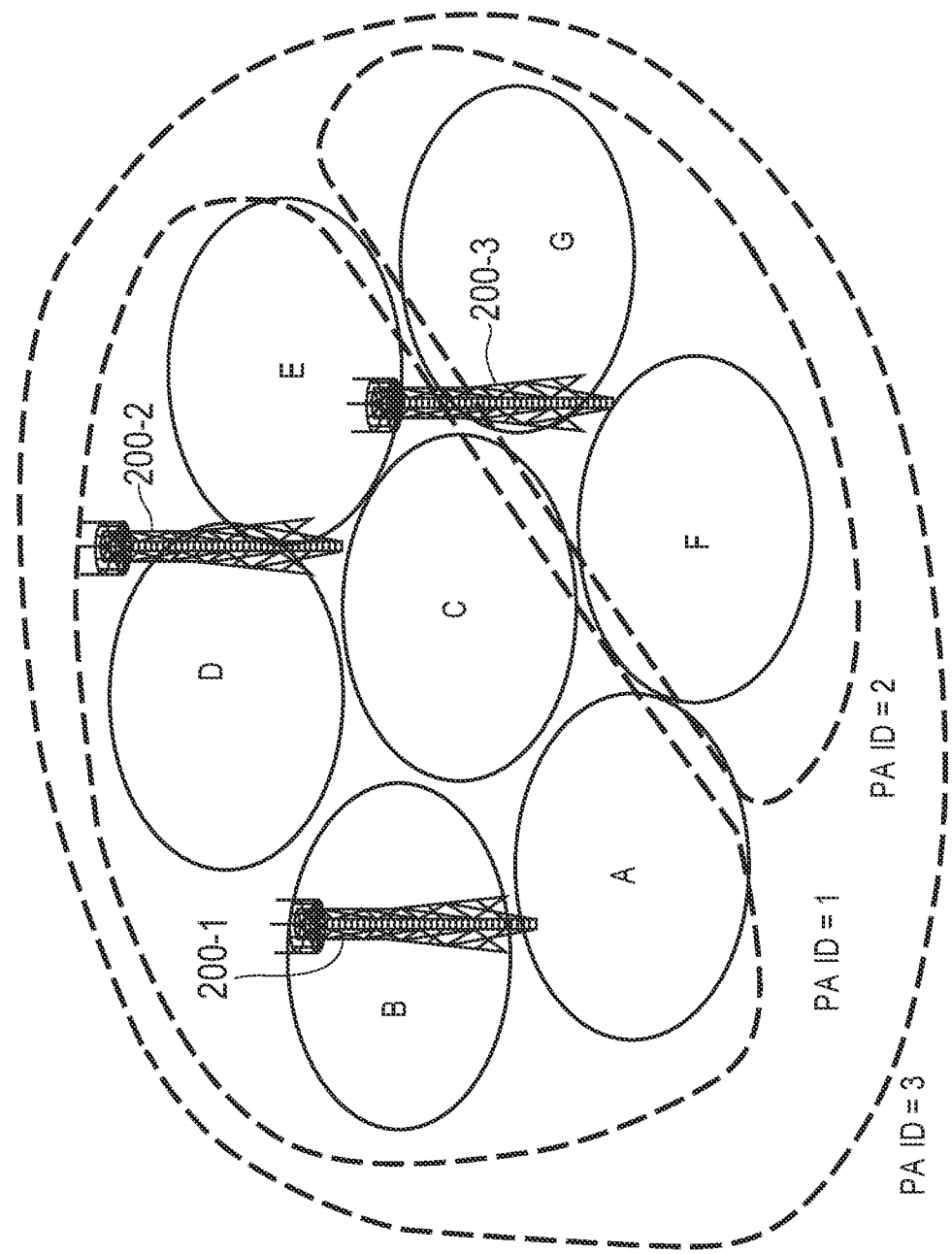
FIG. 9 is a diagram illustrating an assumed scenario according to a second embodiment.

FIG. 9 is a diagram illustrating an assumed scenario according to a second embodiment. As illustrated in FIG. 9, an eNB 200-1 manages cells A and B, an eNB 200-2 manages cells C, D, and E, and an eNB 200-3 manages cells F and G.

The cells A, B, C, D, and E form one RAN paging area, and "PA ID=1" is assigned as the identifier of the RAN paging area. Each of the cells A, B, C, D, and E broadcasts "PA ID=1".

The cells F and G form one RAN paging area, and "PA ID=2" is assigned as the identifier of the RAN paging area. Each of the cells A, B, C, D, and E broadcasts "PA ID=1".

The cells A, B, C, D, E, F, and G form one RAN paging area, and "PA ID=3" is assigned as the identifier of the RAN paging area. Each of the cells A, B, C, D, E, F, and G broadcasts "PA ID=3".

As described above, it is possible to provide a plurality of RAN paging areas having different sizes within the same area by assigning a plurality of RAN paging area identifiers to one cell.

Figure 10:
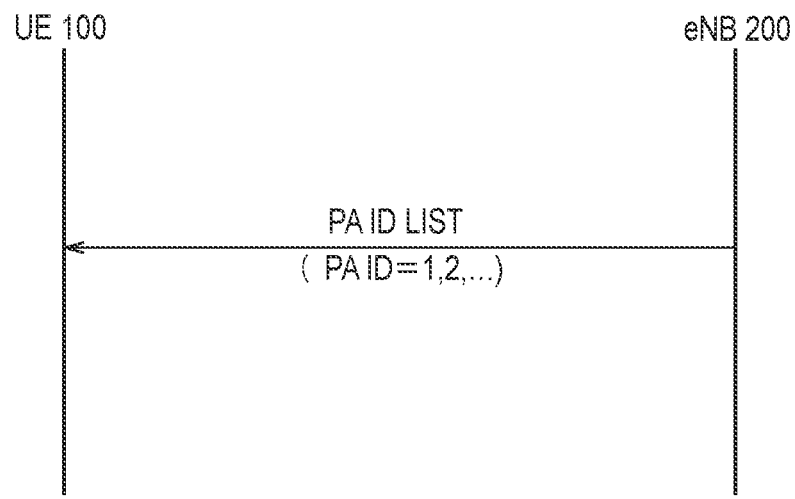
FIG. 10 is a diagram illustrating an operation according to the second embodiment.

FIG. 10 is a diagram illustrating an operation according to the second embodiment. As illustrated in FIG. 10, if a plurality of RAN paging areas are allocated to the cell (or the eNB), the eNB 200 (transmitter 210) transmits, to the UE 100, a list (PA ID list) including a plurality of RAN paging area identifiers via the cell.

Operation Pattern 1

In the operation pattern 1 of the second embodiment, the eNB 200 (transmitter 210) transmits a list including a plurality of RAN paging area identifiers assigned to the cell (or the own eNB) by broadcast signaling. The broadcast signaling may be broadcast RRC signaling (SIB: system information block).

As an example, when the UE 100 in the light connection state reselects another cell by using a cell reselection mechanism similar to an RRC idle mode, the UE 100 receives the PA ID list broadcasted from the another cell (new cell). The UE 100 (controller 130) compares the RAN paging area identifier configured to the UE 100 with each RAN paging area identifier in the list. If the RAN paging area identifier configured to the UE 100 is different from all the RAN paging area identifiers in the list, the UE 100 (controller 130) notifies the another cell (new cell) that it has left the RAN paging area configured to the UE 100.

In addition, if one cell belongs to the plurality of RAN paging areas, it is preferable to configure an appropriate RAN paging area to the UE 100. As an example, if the UE 100 transitions to the light connection state, the eNB 200 (controller 230) selects the RAN paging area identifier to be configured to the UE 100 from the plurality of RAN paging area identifiers to which the cell belongs, based on a movement state of the UE 100. The movement state of the UE 100 may be whether the UE 100 is stationary or moving and/or may be the moving speed of the UE 100. The movement state of the UE 100 may be notified from the UE 100 to the eNB 200, or may be notified from the MME 300 to the eNB 200. If the UE 100 is moving (or moving at a high speed), the eNB 200 (controller 230) may select a wider RAN paging area as the RAN paging area to be configured to the UE 100. The eNB 200 (transmitter 210) transmits, to the UE 100, the selected RAN paging area identifier based on the movement state of the UE 100 by unicast signaling.

Operation Pattern 2 In the operation pattern 2 of the second embodiment, the eNB 200 (transmitter 210) transmits a list (PA ID list) including a plurality of RAN paging area identifiers to be configured to the UE 100 by unicast signaling. The unicast signaling may be unicast RRC signaling (RRC reconfiguration message or RRC release message) to transition to the light connection state. The UE 100 transitions to the light connection state and holds the PA ID list as the RAN paging area identifier configured to the UE 100.

When moving over the plurality of RAN paging areas, the UE 100 (controller 130) to which the plurality of RAN paging areas (PA ID list) are configured may not perform a notification to the network. As an example, when the UE 100 (receiver 110) reselects another cell by using a cell reselection mechanism similar to an RRC idle mode, the UE 100 receives the paging area identifier broadcasted from the another cell (new cell). The UE 100 (controller 130) compares the plurality of RAN paging area identifiers configured to the UE 100 with the RAN paging area identifier of the another cell (new cell). If all the RAN paging area identifiers configured to the UE 100 are different from the RAN paging area identifier of the another cell (new cell), the UE 100 (controller 130) notifies the another cell (new cell) that it has left the RAN paging area configured to the UE 100.

It should be noted that the operation patterns 1 and 2 of the second embodiment may be combined and implemented. In addition, the operation according to the second embodiment may be combined with the operation according to the first embodiment. As an example, if the RAN paging area identifier broadcasted in the cell and the RAN paging area identifier not broadcasted in the cell are configured to the UE 100, the eNB 200 may explicitly configure only the RAN paging area identifier not broadcasted in the cell by including the same in the unicast RRC signaling for transitioning to the light connection state. The UE 100 holds the RAN paging area identifier broadcasted in the cell and the explicitly configured RAN paging area identifier.

Third Embodiment

In the third embodiment, a difference from the first embodiment and the second embodiment will be described below.

Figure 11:
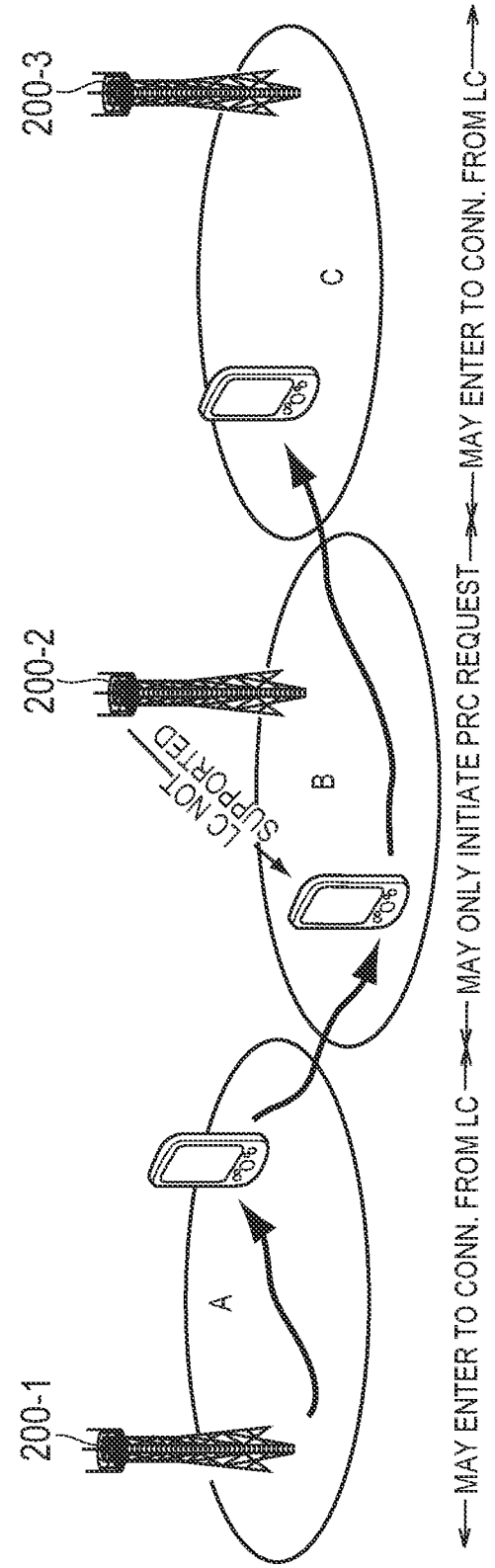
FIG. 11 is a diagram illustrating an assumed scenario according to a third embodiment.

FIG. 11 is a diagram illustrating an assumed scenario according to a third embodiment. As illustrated in FIG. 11, the UE 100 in the light connection state moves across a plurality of cells. However, a cell (eNB 200) that does not have a function of handling the light connection state may exist. The function of handling the light connection state is, for example, a function of resuming the UE 100 from the function of RAN paging and the light connection state. Hereinafter, a cell that does not have such a function is referred to as a "cell that does not support light connection".

In FIG. 11, among the cells A to C managed by the eNBs 200-1 to 200-3, the cell B is a cell that does not support light connection. The UE 100 moves in the order of the cells A, B, and C. Each eNB 200 (each cell) may broadcast information indicating whether the light connection is supported. As an example, the eNB 200 (transmitter 210) transmits the information by SIB. Such information may be implicit information. For example, the UE 100 (controller 130) may regard the cell broadcasting the RAN paging area identifier as a cell that supports light connection. Alternatively, if the selected cell is included in the cell ID list configured to the UE (list of cells included in the RAN paging area), it may be regarded as a cell that supports light connection, and if not included, it may be regarded as a cell that does not support light connection.

In the third embodiment, in the light connection state in which the RAN paging area is configured, the UE 100 (controller 130) determines whether the serving cell supports the function of handling the light connection state. Even if the UE 100 (controller 130) determines that the serving cell does not support the function, the UE 100 (controller 130) maintains the light connection state in the serving cell. Therefore, the UE 100 in the light connection state maintains the light connection state even if it moves from the cell A to the cell B as illustrated in FIG. 11. In other words, even if the cell that does not support light connection is reselected, the UE 100 continues without stopping the light connection operation.

As a comparative example, when moving from cell A to cell B, it is considered to stop the light connection operation and perform the normal RRC idle mode operation. However, when a scenario in which the UE 100 moves from cell B to cell C after that is assumed, the UE 100 preferably continues the light connection operation in the cell B.

In the third embodiment, the UE 100 (controller 130) detects a predetermined event to be resumed from the light connection state. The resumption from the light connection state means stopping the light connection operation and performing the operation in the normal RRC connected mode. The predetermined event may be that the UE 100 has received the paging or that the UE 100 needs to transmit data or signaling.

If the UE 100 (controller 130) determines that the serving cell supports light connection, the UE 100 (controller 130) transmits, to the serving cell, a first RRC message requesting resumption from the light connection state in response to detection of the predetermined event. The first RRC message may be an RRC resume request message or an RRC reestablishment request message.

On the other hand, if the UE 100 (controller 130) determines that the serving cell does not support light connection, the UE 100 (controller 130) transmits, to the serving cell, a second RRC message requesting the establishment of the RRC connection with the serving cell in response to detection of the predetermined event. The second RRC message may be an RRC connection request message. In other words, in order to resume from the light connection state in the cell that does not support light connection, the UE 100 (controller 130) regards the UE 100 as the RRC idle mode and transmits an RRC connection request message. Since the RRC connection request message is a message used when the general UE 100 transitions from the RRC idle mode to the RRC connected mode, the message can be handled even if the cell does not support light connection.

In the cell that does not support light connection, the UE 100 may not be called if the UE 100 in the light connection state does not monitor the conventional paging using the tracking area (that is, paging led by the MME). Therefore, the UE 100 in the light connection state monitors the RAN paging if the currently selected cell supports light connection, and monitors the conventional MME-led paging if not supported. Alternatively, the UE 100 in the light connection state may monitor both the RAN paging and the MME-led paging under the cell that supports the light connection.

Here, in the MME-led paging, the UE 100 monitors the timing specified by international mobile subscriber identity (IMSI) as UE_ID which is the identifier of the UE 100, for example, "SFN mod T=(T div N)*(UE_ID mod N)". On the other hand, the timing of monitoring in the RAN paging may be defined at a timing different from the timing of monitoring in the MME-led paging (at least different parameters can be configured).

In the paging led by the MME, the UE 100 detects the identifier (for example, IMSI, S-TMSI) preset or assigned by the core network as the identifier (that is, paging record) relating to paging (calling). On the other hand, in the RAN paging, the UE 100 detects the identifier (for example, "cell ID+C-RNTI", resume ID, or the like) assigned (or managed) by a RAN node (for example, a base station).

OTHER EMBODIMENTS

In the above-described embodiment, public land mobile network (PLMN) has not been particularly mentioned. The eNB 200 may configure one or more PLMN identifiers (for example, a list of PLMN identifiers) together with the RAN paging area identifier or the cell identifier, as the RAN paging area configured to the UE 100. The UE 100 may recognize the cell broadcasting the RAN paging area identifier or the cell identifier configured to the UE 100 and the cell broadcasting the PLMN identifier configured to the UE 100 as the cell inside the RAN paging area.

In the above-described embodiment, a case in which the timing at which the RAN paging is transmitted is specified by the IMSI has not been particularly mentioned. In this case, since the base station does not know the IMSI of the UE 100 for performing the RAN paging, the base station needs to have the IMSI notified from the UE 100. Therefore, the UE 100 notifies the base station of its own IMSI as capability information indicating that the UE 100 supports the light connection function. In other words, if the IMSI is notified in the capability information of the UE 100, the base station determines that the UE 100 supports the light connection function, and uses the IMSI for identifying the RAN paging timing.

The present disclosure is not limited to the case in which the above-described embodiments are separately and independently performed, and two or more embodiments may be performed in combination. For example, a part of operations according to one embodiment may be added to other embodiments. Alternatively, a part of operations according to one embodiment may be replaced with a part of operations of other embodiments.

In each embodiment described above, the LTE system has been exemplified as the mobile communication system. However, the present disclosure is not limited to the LTE system. The present disclosure may be applied to systems other than the LTE system.

Supplementary Note 1

1. Introduction

In this Supplementary Note, these modeling will be further discussed.

2. Review (2.1. Modeling)

Figure 12:
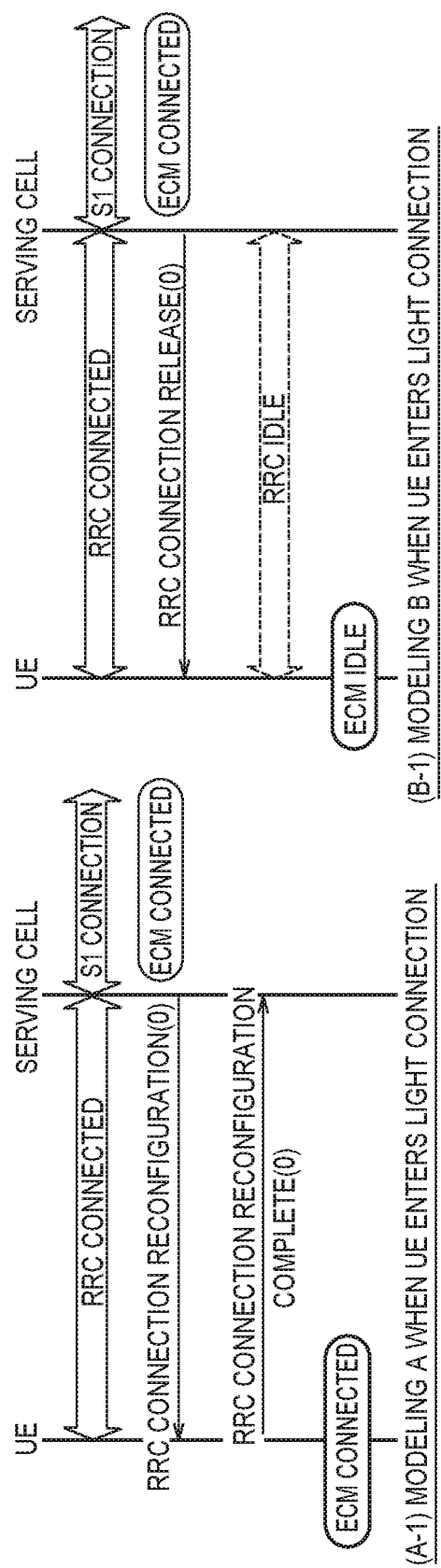
FIG. 12 is a diagram according to Supplementary Note.
Figure 13:
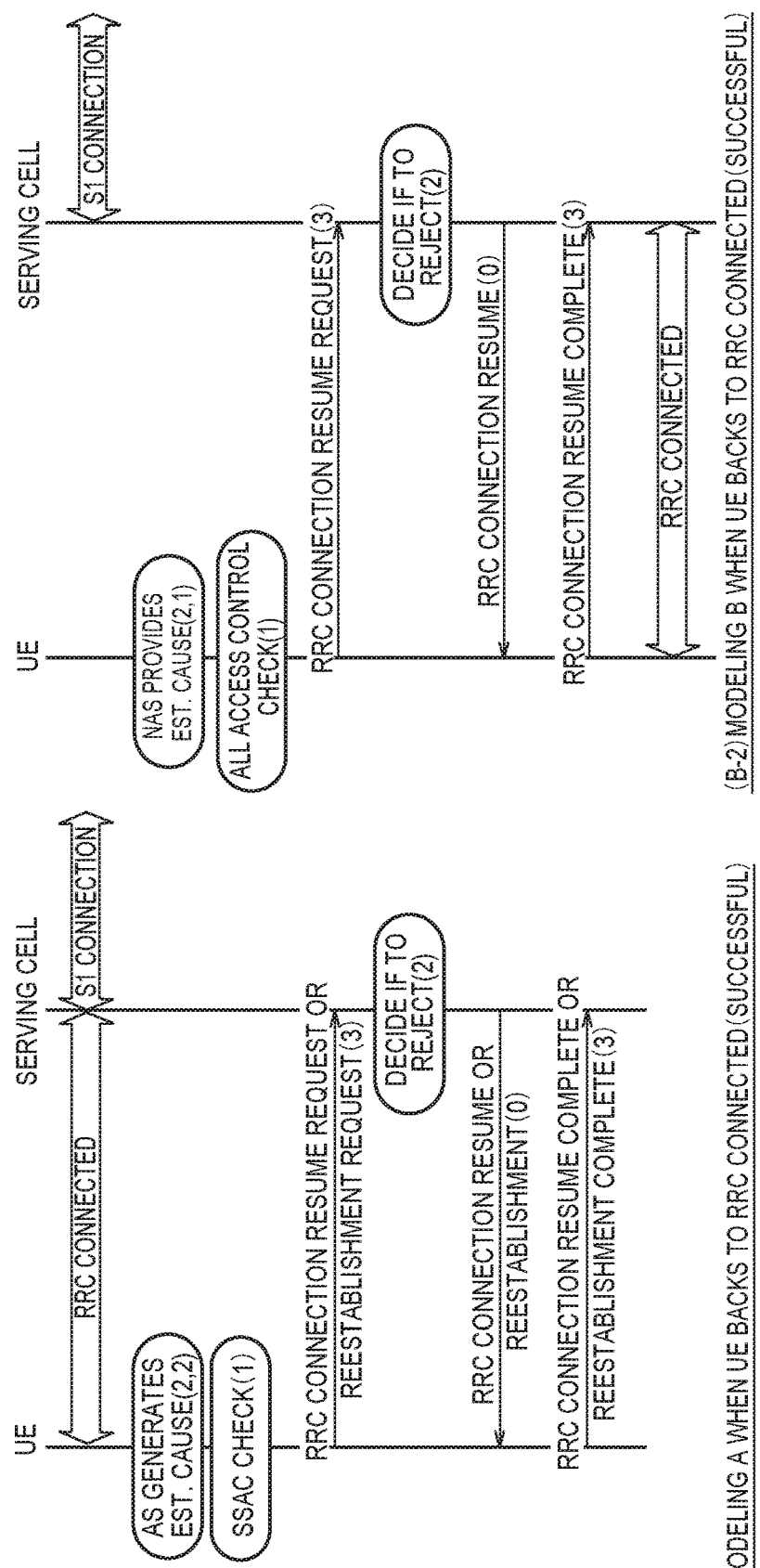
FIG. 13 is a diagram according to Supplementary Note.
Figure 14:
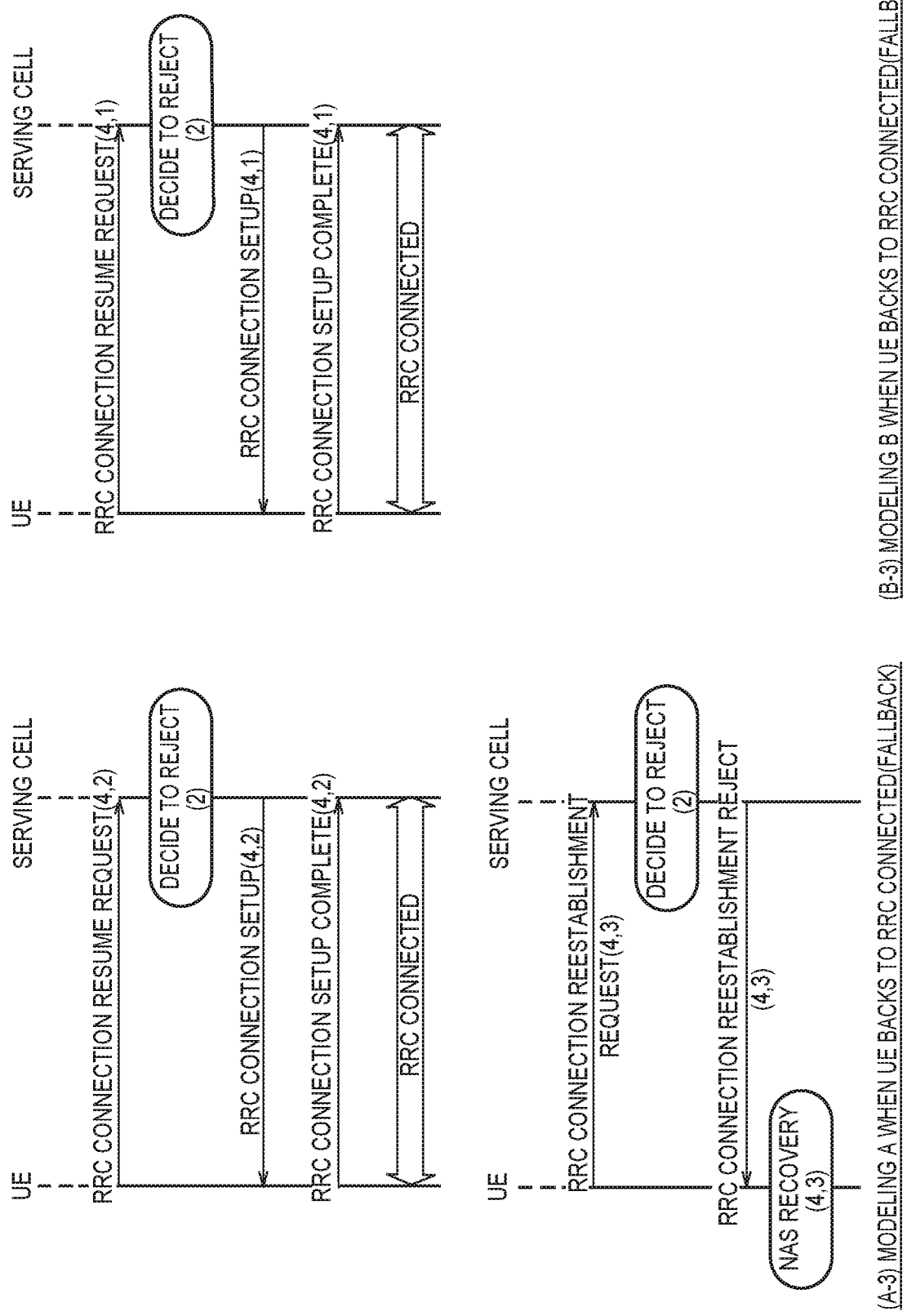
FIG. 14 is a diagram according to Supplementary Note.

FIG. 12, FIG. 13, and FIG. 14 illustrate the procedures when (1) the UE enters light connection, (2) when normally returned to RRC Connected, and (3) when rejected and executing fallback.

In modeling A, it is still FFS whether to return from Light Connection to RRC Connected using either an RRC connection resume request or an RRC connection reestablishment request. Conceptually, from the viewpoint of the messaging, since the RRC connection is maintained, that is, the RRC connection is not interrupted by the use of the RRC connection reconfiguration for entering RRC Connected, the RRC connection reestablishment request is more appropriate. Furthermore, in the case of RRC connection reestablishment reject, it is already agreed that the conventional NAS recovery will be reused. In addition, if the RAN 2 uses RRC Connection Resume Request, the CT 1 is defined in Rel-13, which is used only for UEs in EMM-IDLE mode, regarding RAN 2's query on the possibility of fallback to RRC connection establishment in the case of Model A. Therefore, when the UE returns to RRC Connected, it is preferable to use the RRC connection reestablishment request.

Proposal 1: In modeling A, if the UE needs to return from Light Connection to RRC Connected, an RRC connection reestablishment request should be transmitted.

Although there is an approach for the RAN 2 to ask the CT 1 to support modeling problems, the CT 1 has made a preliminary discussion on both modeling A and modeling B and observed the potential effect of modeling A and modeling B. If not deeply analyze this problem, it will be difficult to provide answers quickly. Therefore, the RAN 2 needs to independently decide which modeling is to be used.

Discussion 1: The RAN 2 should decide the modeling to apply to the light connection and notify the CT 1 of the decision and details.

The first statement of the WI's goal is that the purpose of this work item is to reduce the signaling overhead of radio and network interfaces and to improve UE access latency and UE power consumption for all apparatus types. That is, radio signaling overhead and UE access latency reduction should be considered, as well as all apparatus types such as regular LTE UEs such as smartphones as well as MTC UEs. Regarding MTC type traffic, it has already been optimized by RRC Connection Suspend/Resume of Rel-13, but it can be applied to ordinary LTE UE. However, for example, assuming the condition that data is temporarily inactive, it is not the same for non-MTC type traffic. Therefore, Release 14 work should instead focus on reducing the signaling and access latency of a typical LTE UE (for example, smartphone traffic) based on Modeling A.

Discussion 2: Light Connection should consider reducing radio overhead and UE access latency for all types of traffic as well as MTC type traffic that has already been optimized in Release 13, including those applicable for smartphone usage.

Proposal 2: The RAN 2 should match modeling A of Light Connection.

(2.2. Cells not Supporting Light Connected)

Regardless of the choice of modeling, it is FFS that the UE should know whether the light connected function is supported. The RAN 2 agreed with a cell reselection mechanism similar to RRC idle. Thus, as long as all the eNBs in the network support the return from Light Connection to RRC Connected, the operation of the UE follows the idle mode procedure in terms of cell reselection. Although NW-implemented, Release 13 does not assume that all eNBs in the network support new features, for example, eDRX-Allowed for eDRX, voiceServiceCauseIndication, Up-CIoT-EPS-Optimization, and cp-CIoT-EPS optimization for VoLTE establishment. Therefore, it is worth considering whether it can be inferred that all eNBs in the network support light connection.

Proposal 3: The RAN 2 should introduce indications into SIB 2 if the cell supports light connection, that is, if the UE is allowed to transmit an RRC message for a request to return from a light connection to an RRC connection.

If some eNBs do not support light connection, the UE may be unreachable from the RAN paging, and thus the problem is how the UE should behave. One possibility is that the UE prioritizes the cells that support light connection as much as possible. Another possibility is that the UE transitions to RRC idle each time the cell that does not support light connection is reselected. The RAN 2 should consider the UE-based mobility details during the light connection.

Proposal 4: If Proposal 3 is reasonable, the RAN 2 should discuss the idle mode procedure, for example, the expected UE behavior during cell reselection.

(2.3 Recognition of Data Inactive During RRC Connection)

Since the UE is lightly connected by RRC signaling, the serving cell should determine the timing to trigger the UE to enter RRC Connected. One possible implementation is for the serving cell to monitor traffic behavior and trigger the UE to enter RRC Connected in order not to be active for a certain period of time (for example, a fixed time). Since this mechanism depends on expected traffic behavior, if the expected traffic estimate is inaccurate, for example, signaling overhead actually increases due to frequent transitions between RRC Connected and RRC connection, or the opportunity to enter RRC Connected is lost. The expected MTC type traffic can be easily estimated, but LTE type traffic, smartphone traffic behavior, and NW may not be easy to predict. Therefore, since the UE has better knowledge/control of its traffic behavior, it may be necessary for the UE to provide some assistance information. It is therefore worth considering whether the serving cell configures the UE and provides specific assistance information allowing the eNB to make better decisions to trigger the UE on the light connection.

Proposal 5: The RAN 2 discusses whether the serving cell can configure the UE to provide assistance information so that it can better determine when the eNB triggers the UE to enter the light connection.

If Proposal 5 is valid, the assistance information may be similar to existing power preference indicator (PPI) and/or MBMS interest indication (MII). In the case of using PPI, the UE can notify low power consumption if its power consumption is preferably optimized, for example, by a longer DRX cycle. MII was used to notify MBMS frequency and priority of interest between unicast and MBMS, for example, if handover to frequency is preferred. In this case, the UE can notify the serving cell when it is appropriate for the UE to enter the light connection. In other words, the UE can transmit assistance information if data transmission and reception is inactive within a certain period of time or when it is inactive. The details and necessity of additional assistance is the expected inactivity time of the FFS, for example, the UE.

Proposal 6: The RAN 2 should consider whether the UE should transmit assistance information when the data is inactive.

Supplementary Note 2

1. Introduction

In this Supplementary Note, details of modeling A will be described.

(2.1. RAN Paging Area)

The method of configuring the UE in the RAN paging area is still FFS. Two options are discussed Option 1: Proposal 2 is taken as a baseline. The eNB may optionally signal the global cell identification list to the UE via RRC-dedicated signaling so as to indicate a RAN-based paging area. It should be aimed at minimizing signaling and configuration overhead (for example, cellIdentity can be used instead of the global cell ID).

Option 2: The eNB transmits dedicated signaling (so as to configure, to the UE, the RAN-based paging area to be used) and broadcast (so as to indicate the RAN-based paging area to which the eNB belongs).

These options may be considered useful in different scenarios, respectively. For example, the network can use option 1 if flexible configuration is required for each UE, and can use option 2 if intended to minimize signaling overhead. Therefore, two options should be introduced in the configuration of the RAN paging area.

Proposal 1: The RAN 2 should introduce two options for RAN paging area configuration, which have a cell ID list and a broadcasted RAN paging area ID.

If Proposal 1 is reasonable, one concern can arise if different options are simultaneously configured for different UEs in a mixed network with two options for different implementations. If it can be assumed that a cell in the RAN paging area includes only an "anchor eNB" via X2, that is, an eNB connected with an X2 paging reachable cell, since such a mixed arrangement should be notified to the network by lightly connected UEs when the anchor eNB moves outside the configured RAN-based paging area, it is forbidden to configure the UE at the same time on both options. The UE outside the configured RAN paging area returns to the RRC connection and is reset in the new RAN paging area as necessary. Therefore, there is a possibility that it can be at least considered that there is no problem from the viewpoint of the reachability of the UE.

Proposal 2: If Proposal 1 is satisfactory, the UE should not configure both options at the same time.

For option 1 (cell ID list), which cell ID should be applied is FFS (ECGI ("PLMN ID+ECI"), ECI ("eNB ID+CI": CellIdentity)) or physical cell ID (PhysCellId)). Long IDs can avoid confusion among UEs, but signaling overhead increases, and shorter IDs may confuse them. Therefore, as a compromised solution, RAN 2 should consider using CellIdentity in the list. If confusion concerns still exist, the PLMN ID (or its list) may optionally be configured with the cell ID list.

Proposal 3: In option 1, the RAN 2 should agree that the cell ID list should be configured with CellIdentity.

For option 2 (that is, having a broadcasted RAN paging area ID), the proposal can be interpreted that there is "a newly defined RAN-based paging area identifier", that is, one RAN paging area ID to be broadcasted by the serving cell and it is configured to the UE. The problem is whether more than one RAN paging area ID is useful. For example, if the cell belongs to two RAN paging areas, for example, a larger area and another smaller area, the serving cell can select which RAN paging area is suitable for each UE. For example, the UE with a high mobility is configured with a wider area so as to avoid frequent notification, and the stationary UEs may be configured in smaller areas so as to reduce signaling overhead due to RAN paging. As another example, assuming that only a single RAN paging area ID can be broadcasted for each cell, it is possible for the UE's RAN paging area to be configured with multiple RAN paging area IDs, thereby efficiently configuring the RAN paging area of the UE more than the combination of the individual areas. In both cases, the UE may be configured with different sized RAN paging areas as necessary. It is therefore worth considering whether to allow multiple RAN paging area IDs to be broadcasted and/or configured.

Proposal 4: In option 2, the RAN 2 should discuss whether to permit multiple RAN paging area IDs (broadcast and/or configuration).

If it is decided to stick to the original proposal that only a single RAN paging area ID is broadcasted and configured, there is no need to explicitly configure the UE with RAN paging area ID when entering RRC Connected. The RAN paging area ID to be configured is the same as that broadcasted by the anchor eNB transmitting the UE to the light connection. Otherwise, if different RAN paging area IDs that are block sized are configured to the UE, some ping-pongs may be of concern as they must return immediately to RRC Connected to transmit notifications.

Proposal 5: In option 2, if the cell can broadcast only a single RAN paging area ID, the UE implicitly uses the RAN paging area ID broadcast by the "anchor eNB" that triggers the UE without explicitly configuring the RAN paging area ID and proceeds to Light Connected.

(2. 2. RAN Paging Message)

RRC's RAN-initiated paging message is defined to reuse a legacy RRC paging messages (with extension as necessary), but whether to use S-TMSI or to use the new RAN ID is still FFS.

The use of S-TMSI currently has security concerns. The RAN 2 does not control the MME and requests SA 3 for feedback on the potential security problem of exposing S-TMSI with RRC message for RAN initiated paging. Therefore, the RAN 2 needs to wait for SA 3's response before final decision, but as with modeling A and modeling B, it may be possible to proceed with the premise of introducing a new RAN ID.

As discussed, new RAN IDs should be explicitly defined for signaling reduction. Considering that the UE in the RRC Connected is identified by the C-RNTI, the UE in Light Connection can also be identified within the RAN paging area that has been configured by the cell ID (belonging to "anchor eNB")+C-RNTI in the cell. If the content of the ID is explicitly specified, the UE shall use the RRC signaling to determine whether the ID was paged even if it was not explicitly configured.

Proposal 6: When a new RAN ID is introduced, the RAN 2 should define it as "cell ID (CellIdentity)+C-RNTI".

Proposal 7: If Proposal 6 is satisfactory, there is no need to explicitly assign the ID from the "anchor eNB" cell to the UE when the UE enters Light Connected.

(2.3. RAN Paging Opportunity)

In the calculation of RAN-initiated paging opportunities, it was concluded that the preferred UE ID was "IMSI mod x" design (similar to conventional paging calculations). In the case of "Open Issue 5: eNB handling of unreachable UE in the case of RAN paging failure", this approach is useful for the UE to avoid "double check" of MME startup paging and RAN startup paging. The eNB handling is that the eNB triggers the S1 UE context release and transmits the NAS NON DELIVERY INDICATION to the MME, before that, if necessary, and it is invisible from the viewpoint of the UE.

Since FFS is only known by the UE or IMS, FFS is how the IMSI of the UE is notified to the serving cell. The RAN 2 is seeking "whether there is any concern to enable signaling to provide "UE IMSI MOD X" to the eNB when the UE is in the ECM_CONNECTED from the view's MME point", but the RAN 2 has already agreed that the Light Connected state is maintained and the S1 connection of the UE is active in order to hide mobility and state transitions from the CN. In addition, in the RAN 3, it is considered that the MME is not aware whether the UE is in light connection. Therefore, the IMSI should be notified from the UE, not the MME.

The RAN 2 also agreed to "define a new optional radio capability within UE-EUTRA-Capability IE to indicate that the UE supports release 14 Light connection operation. "Therefore, it is reasonable that the IMSI is notified via a new UE function for Light Connection support like the concept similar to wlan-MAC-Address-r 13 of LWA.

Proposal 8: If the "IMSI mod x" design is determined, the RAN 2 should agree that IMSI will be notified by the UE capability for light connection support by the UE.

However, if IMSI signaling in Proposal 8 is not preferable, the RAN 2 should consider a solution that does not have an ID, that is, reuses C-DRX. The concern of this solution is that the UE should "double-check" the paging messages within I-DRX PF/PO and C-DRX OnDuration. Light Connection is configured during temporary data inactivation. Such a short period is FFS in which light connected UEs are configured with specific DRX (this is used for paging PO/PF calculation initiated by RAN) cycles that can be configured by the eNB via dedicated RRC signaling and include at least 320, 640, 1280, and 2560 ms, and other values are also defined.

Proposal 9: If the "IMSI mod x" design is not determined, the RAN 2 should agree that C-DRX should be reused for RAN paging opportunity.

The invention claimed is:

1. A user equipment for a mobile communication system, comprising:
    a transmitter configured to transmit to a base station, when the user equipment is in a radio resource control (RRC) connected state, assistance information indicating that the user equipment prefers to enter a specific state that is not the RRC connected state, the specific state being an RRC state in which context information of the user equipment is maintained in both the user equipment and the base station, the signaling for the user equipment is suppressed while a connection for the user equipment is maintained between the base station and a core network and a radio access network (RAN) paging area is configured to the user equipment;
    a receiver configured to receive an RRC release message for transitioning the user equipment from the RRC connected state to the specific state, from the base station, the RRC release message comprising a RAN paging area identifier indicating the RAN paging area configured by the base station to the user equipment; and
    a controller configured to cause the user equipment to transition to the specific state in response to the reception of the RRC release message.

2. The user equipment according to claim 1, wherein the transmitter is configured to transmit the assistance information when the user equipment expects not to transmit or receive data in near future.

3. A base station for a mobile communication system, comprising:
    a receiver configured to receive, from a user equipment in a radio resource control (RRC) connected state, assistance information indicating that the user equipment prefers to enter a specific state that is not the RRC connected state, the specific state being an RRC state in which context information of the user equipment is maintained in both the user equipment and the base station, the signaling for the user equipment is suppressed while a connection for the user equipment is maintained between the base station and a core network and a radio access network (RAN) paging area is configured to the user equipment; and
    a transmitter configured to transmit an RRC release message for transitioning the user equipment from the RRC connected state to the specific state, to the user equipment,
    wherein the RRC release message comprises a RAN paging area identifier indicating the RAN paging area configured by the base station to the user equipment.

4. A control method for a user equipment of a mobile communication system, comprising:
    transmitting to a base station, when the user equipment is in a radio resource control (RRC) connected state, assistance information indicating that the user equipment prefers to enter a specific state that is not the RRC connected state, the specific state being an RRC state in which context information of the user equipment is maintained in both the user equipment and the base station, the signaling for the user equipment is suppressed while a connection for the user equipment is maintained between the base station and a core network and a radio access network (RAN) paging area is configured to the user equipment, receiving an RRC release message for transitioning the user equipment from the RRC connected state to the specific state, from the base station, wherein the RRC release message comprises a RAN paging area identifier indicating the RAN paging area configured by the base station to the user equipment.

* * * * *